United States Patent [19]
Duboudin et al.

[11] Patent Number: 6,159,003
[45] Date of Patent: Dec. 12, 2000

[54] COMBUSTION PROCESS USING SEPARATE INJECTIONS OF FUEL AND OF OXIDIZER

[75] Inventors: Thierry Duboudin, Vincennes; Bernard Labegorre, Paris, both of France

[73] Assignee: L'Air Liquide, Societe Anonyme pour l'Etude et l'Exploitation des Procedes Georges Claude, Paris, France

[21] Appl. No.: 09/276,674

[22] Filed: Mar. 26, 1999

[30] Foreign Application Priority Data

Apr. 2, 1998 [FR] France .................................. 98 04116

[51] Int. Cl.[7] ...................................................... F27B 15/00
[52] U.S. Cl. .............................. 432/14; 432/17; 432/196; 431/10
[58] Field of Search ................................ 432/14, 17, 196; 431/10, 165, 190, 179

[56] References Cited

U.S. PATENT DOCUMENTS 4,946,382  8/1990  Kobayashi et al. .
5,299,929  4/1994  Yap .

FOREIGN PATENT DOCUMENTS 0 535 846 A2  4/1993  European Pat. Off. .
0 621 454 A1  10/1994  European Pat. Off. .
0 748 982 A2  12/1996  European Pat. Off. .
0 754 912 A2  1/1997  European Pat. Off. .

*Primary Examiner*—Denise L. Ferensic
*Assistant Examiner*—Jiping Lu
*Attorney, Agent, or Firm*—Burns, Doane, Swecker & Mathis, L.L.P.

[57] ABSTRACT

Combustion process in a furnace comprising a floor on which a charge to be heated is placed, and a roof lying above the charge, in which process the combustible fluid and the oxidizer fluid are injected separately between the surface of the charge and the roof, characterized in that the oxidizer and the fuel are injected at two different levels and in that the ratio of the impulsive forces $(m_2.v_2/m_1.v_1)$ of the combustible and oxidizer fluids is greater than or equal to approximately $\frac{1}{3}$, $m_1$ being the mass flow rate of the top fluid and $v_1$, its velocity of injection into the furnace, $m_2$ being the mass flow rate of the bottom fluid and $v_2$ its velocity of injection into the furnace.

10 Claims, 2 Drawing Sheets

COMBUSTION PROCESS USING SEPARATE INJECTIONS OF FUEL AND OF OXIDIZER

BACKGROUND OF THE INVENTION

1. Field of the Invention

The present invention relates to a combustion process using separate injections of at least one fuel and of at least one oxidizer, as well as to the use of this process for controlling and/or regulating the position of a flame when separate injections of the said fuels and oxidizers are used.

2. Description of the Related Art

The combustion process is carried out in a furnace comprising a floor on which a charge to be heated is placed, and a roof lying above the charge, into which a first fluid and a second fluid are injected separately, these fluids being capable of causing combustion between them, the injections of these fluids being carried out between the surface of the charge and the roof, the first fluid being either a combustible fluid or an oxidizer fluid, whereas the second fluid is either an oxidizer fluid or a combustible fluid.

Many documents in the prior art, such as U.S. Pat. Nos. 4,863,371, 4,946,382, 4,988,285 and U.S. Pat. No. 5,076,779, describe methods for the combustion of a fuel using an oxidizer such as oxygen or oxygen-enriched air, in which the amount of nitrogen oxides ($NO_x$) generated is reduced.

Other publications, for example such as U.S. Pat. Nos. 4,541,796, 5,302,112 and U.S. Pat. No. 5,643,348, describe burners having different geometries, corresponding especially to separate injections of fuels and of oxidizers, the differences between these burners essentially consisting of the number of injections or of injectors, the distance between the injectors, their relative positions, etc.

These various processes, as well as the use of these various burners in a furnace in which a charge has to be heated or melted by the supply of energy from these burners, all have, however, the drawback that, when the burners are fitted or when it is desired to carry out the said processes, it may happen that the separate injections of fuels and of oxidizers, more particularly when the fuel is injected above the oxidizer, tend to cause the fuel to rise towards the roof, thereby causing combustion, i.e. a hot flame, near the roof. Such an operation may be particularly dangerous, since it may destroy the roof of the furnace.

At the present time, the problem therefore arises, when separate injections of fuels and of oxidizers are used, of how to control these injections so as to prevent the fuel/oxidizer mixture, and preferably at least the fuel, from rising towards the roof. The purpose of this control is to keep the gases more or less in the region of the height at which they are injected into the furnace, without these oxidizers and/or fuels undergoing a substantial rise towards the roof. The expression "substantial rise" should be understood to mean a rise which would bring gases whose temperature is too high and/or gases that are reducing (or that are too reducing) in the region of the roof, something which, in both cases, could result in the refractories in the roof being damaged.

SUMMARY OF THE INVENTION

In order to solve the problem posed, a first hypothesis which springs to mind consists in assuming that gravity has an influence on the position of the flame, particularly natural gas, which is the lightest of the gaseous components present in the furnace when a natural-gas fuel is used, could have a tendency to move up to the roof of the furnace and could therefore be the cause of the problems thus encountered.

Trials conducted by the Applicant have shown that gravity did not have an appreciable influence on the flame characteristics, under conditions in which the injections are more or less horizontal, i.e. more or less parallel to the surface of the charge to be melted.

After having carried out extensive research, the Applicant has demonstrated the importance of the respective velocities of the oxidizer jets and fuel jets with regard to the upwards orientation of the flame (towards the roof) or the downwards orientation of the flame (i.e. towards the charge).

The present invention is based on the demonstration of the importance of the ratio of the impulsive force of the lowermost fluid to the impulsive force of the uppermost fluid, i.e. the momentum flow rate ($Q_m \cdot v$) of the fluid whose point of injection is closest to the surface of the charge to be heated to the momentum flow rate ($Q_m \cdot v$) of the fluid whose point of injection is closest to the surface of the roof, i.e. in a horizontal plane lying above the horizontal plane corresponding to the injection of the lowermost fluid. The term "momentum flow rate" should be understood to mean the mass flow rate multiplied by the velocity. The terms "momentum flow rate" and "impulsive force" will be used alternatively to denote the same quantity $Q_m \cdot v$.

The process according to the invention is characterized in that the first fluid is injected at a first level into the furnace and the second fluid is injected at a second level into the furnace, in that the first level lies below the second level with respect to the charge to be heated and in that the impulsive force of the fluid injected at the second level is less than or equal to approximately 3 times the impulsive force of the fluid injected at the first level.

Preferably, the combustion process according to the invention is characterized in that the impulsive force of the fluid injected at the second level is less than or equal to approximately 1.5 times that of the fluid injected at the first level.

When the bottom injector 340 consists of a plurality of bottom injectors, the impulsive force corresponds to the sum of the impulsive forces of each injector.

Likewise, when the top injector 350 comprises several injectors, the impulsive force corresponds to the sum of the impulsive forces of each injector.

In the case in which there are more than two injectors, especially a bottom injector which injects a first fluid, a middle injector which injects a second fluid and a top injector which injects the first fluid, the impulsive force of the top jet must remain less than 3 times the impulsive force of the bottom jet, if the impulsive force of the middle jet is less than approximately 3 times the higher of the impulsive forces of the top and bottom jets (above this factor, it is the middle jet which controls the position of the flame).

DETAILED DESCRIPTION OF THE PREFERRED EMBODIMENTS

Without wishing to be tied by any theory, the inventors believe that the invention may be explained in the following manner:

When a single jet is injected into a confined enclosure, two gas recirculations are created, one below the point of injection and the other above the point of injection, which recirculations are produced, on the one hand, between the level of the charge and the point of injection and, on the other hand, the roof of the furnace and the point of injection. If the jet lies closer to one of these two surfaces, the recirculations do not have the same intensity and the jet may be deflected from its initial direction: for example, if the point of injection lies below the middle of the side wall with respect to the surface of the charge 330 and to the roof 320, i.e. closer to the surface of the charge 330 than the roof 320, the recirculation on the side facing the floor will be much greater than the recirculation on the side facing the roof, which results in a greater gas flow towards the floor than the roof, i.e., in general, in the direction of the recirculation of greater intensity. In the case of two close jets, one placed more or less on top of the other, each jet creates, in the vicinity of the closest wall, a recirculation whose intensity depends primarily on the velocity of the jet and to a lesser extent on its position with respect to the side wall. Depending on the respective intensities of these recirculations, it is then possible to deflect the jets to one or other of the walls (the roof or the floor).

Figure 1:
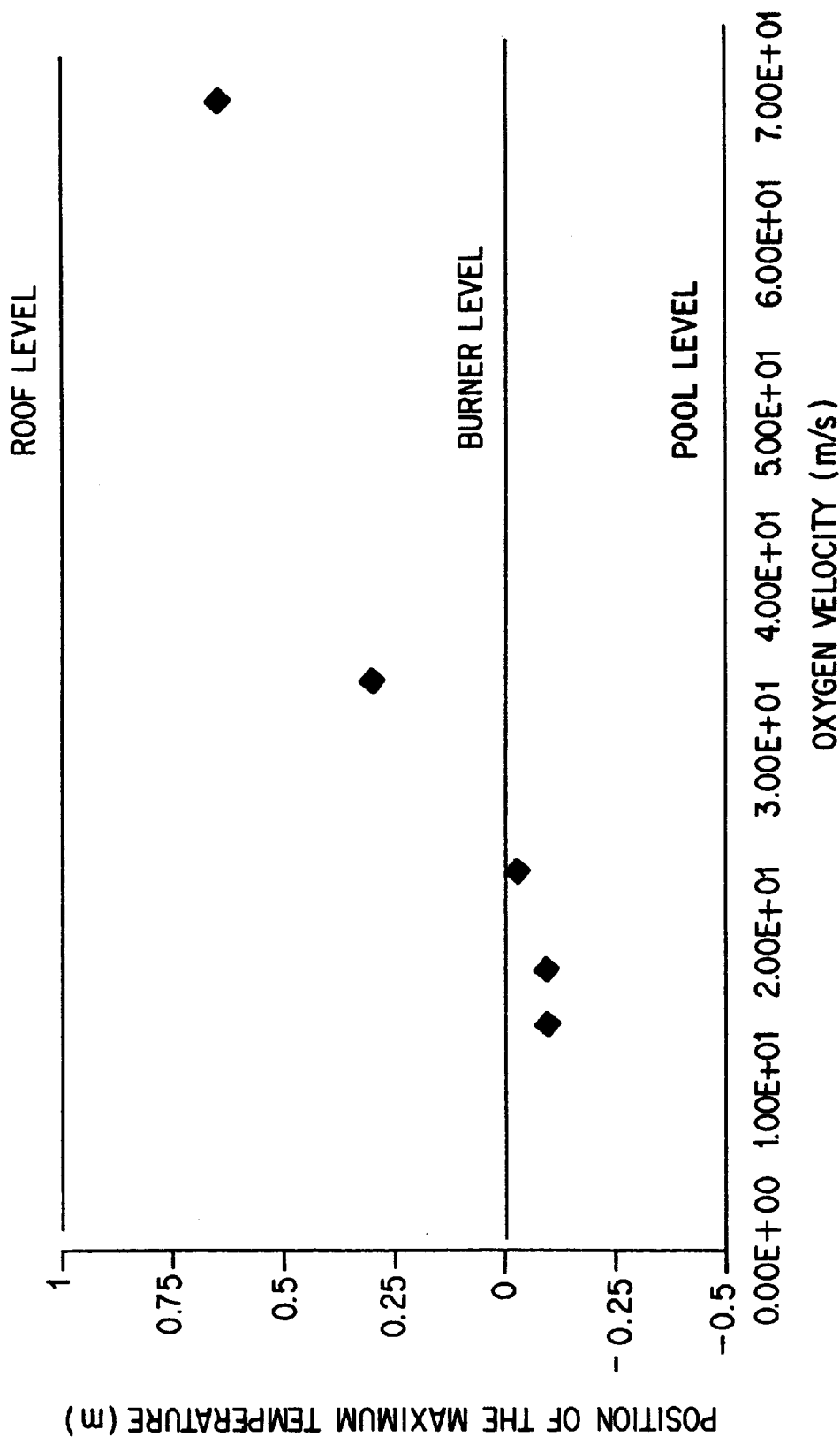
FIG. 1 of the Drawing graphically relates the position of the maximum temperature (m) vs. oxygen velocity (mis).

The invention will be more clearly understood with the aid of the illustrative embodiments below, these being presented in conjunction with the figures which show:

FIG. 1, a curve showing the maximum temperature position (in metres) with respect to the burner level as a function of the injection velocity of the oxygen, or in general of the oxidizer gas, expressed in metres per second. (The term "burner level" is the level of the plane lying at an equidistance from the top and bottom injectors.)

Figure 2:
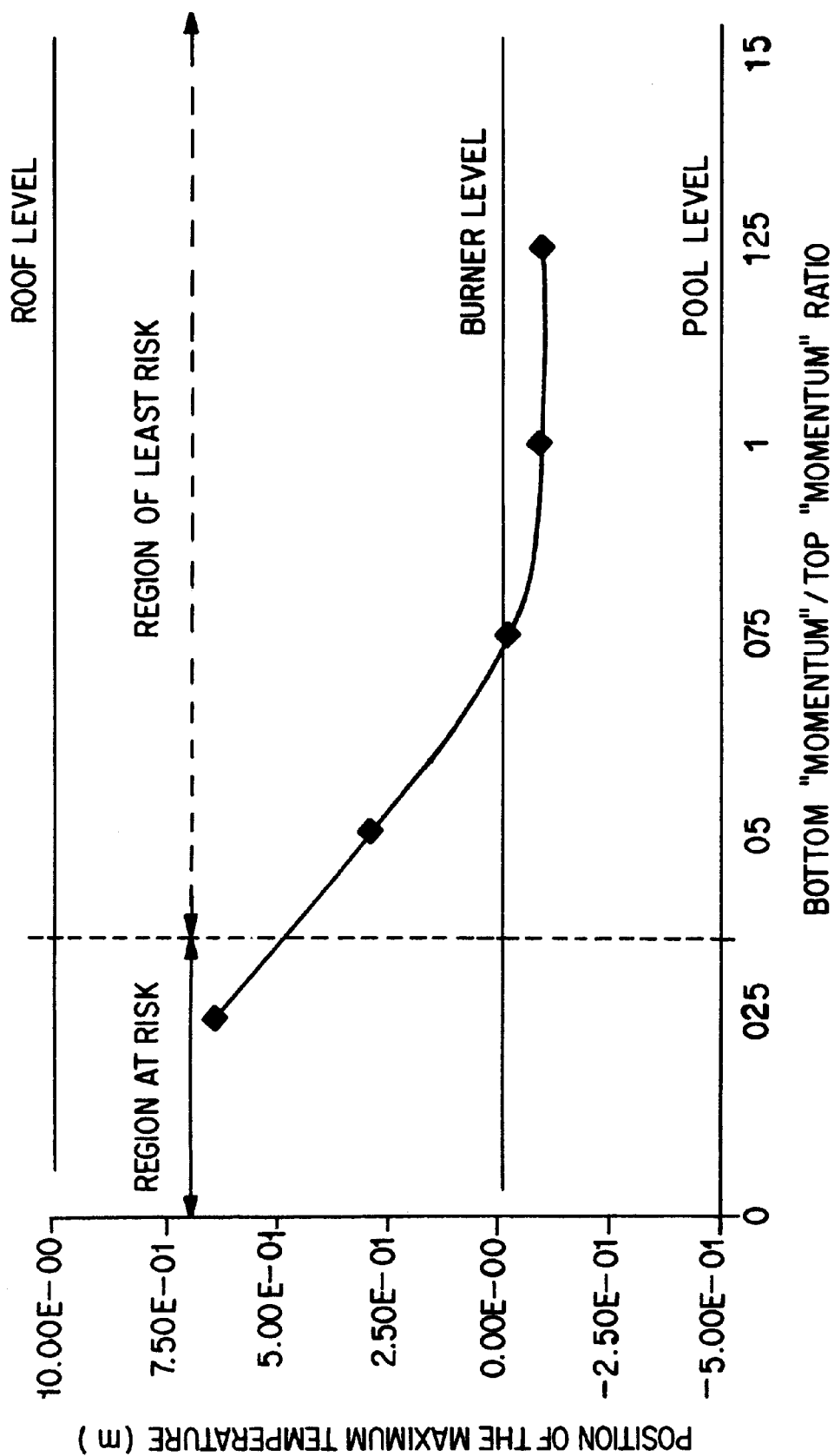
FIG. 2 of the Drawing graphically relates the position of the maximum temperature (m) vs. bottom momentum/top momentum ratio.

FIG. 2, a curve showing the ratio of the impulsive forces of the top and bottom injections, as a function of the maximum temperature position of the flame. FIG. 3, a schematic diagram of an exemplary combustion furnace.

EXAMPLE 1

Placed in a furnace 300, having dimensions of 5 metres in length and 1.5 metres in height are a bottom injector 340, for injecting a first fluid, and a top injector 350, for injecting a second fluid, these lying in the same vertical plane, the axes of which are separated by a distance 1 of 0.25 m. The distance between the surface of the pool to be heated (for example a glass pool) and the point equidistant from the axes of the injectors is 0.5 m.

A fluid, which is oxygen, is injected into the top injector 350 at a velocity of 15 metres per second while a fluid, which is natural gas, is injected into the bottom injector 340 at a velocity of 60 metres per second.

By varying the injection velocity of the oxygen, between approximately 13 and 70 metres per second, the position of the flame thus created by the two injectors is measured, by noting the position of the temperature maximum with respect to the axis of the burner. The results are given in FIG. 1, in which it is clearly apparent that if the velocity of the oxygen, and more generally of the oxidizer, i.e. the top fluid, increases then, little by little, the highest temperature lies higher and higher with respect to the 0 level of the burner and, for example in the present case, for an oxygen velocity of 70 metres per second, lies approximately 0.70 metres above the burner level, i.e. approximately 1.20 metres above the level of the pool.

Next, by varying the momenta of the gases injected into the bottom injector 340 and into the top injector 350, particularly by varying their respective velocities while keeping the same mass flow rate, the position of the maximum flame temperature with respect to the axis of the burner is measured as previously and it may be seen, from the results given in FIG. 2, that, when this ratio of the momenta is less than approximately 0.3, this position is in a region lying more than 0.5 metres above the axis of the burner, i.e. approximately 1 metre above the level of the pool of material to be heated (for example, glass); in general, this constitutes a maximum value for the position of maximum temperature if it is desired, during continuous operation of the furnace, to prevent the roof from being destroyed. Preferably, this ratio of the momenta should be varied so as preferably to bring the position of the maximum temperature of the flame close to the axis of the burner (whether above or below the latter). It is therefore found that, preferably, the ratio of the momenta must be greater than 0.3 and preferably greater than approximately 0.6.

EXAMPLE 2

The above experiments were repeated with various fuels, such as propane, butane, liquefied petroleum gas (LPG) and fuel oil (light and heavy) and it was found that more or less the same results as those illustrated in the previous curves were obtained, i.e. the effect obtained, of locating the maximum flame temperature at a suitable point, does not depend on the fluids used, whether the fuel or the oxidizer, but simply depends on the ratio of the momenta, as explained above.

Likewise, it is found that injecting impure oxygen, that is to say an oxidizer containing at least 20% oxygen, preferably more than 35% $O_2$ and even more preferably more than 88% oxygen by volume, did not modify the results obtained, whatever the other gas (or other gases) present in the oxygen.

What is claimed is:

1. A combustion process in a furnace, comprising:
   providing a floor on which a charge to be heated is placed, and a roof disposed above the charge;
   injecting a first and second fluid separately, between the surface of the charge and the roof, the fluids being capable of causing combustion between themselves, and wherein the first fluid is a combustible fluid and the second fluid is an oxidizer fluid or the first fluid is an oxidizer fluid and the second fluid is a combustible fluid;
   injecting the first fluid at a first level into the furnace and the second fluid into the second level, wherein the first level lies below the second level with respect to the charge to be heated and in that the impulsive force of the fluid injected at the second level is less than or equal to approximately 3 times the impulsive force of the fluid injected at the first level.

2. The combustion process according to claim 1, wherein the impulsive force of the fluid injected at the second level is less than or equal to approximately 1.5 times the impulsive force of the fluid injected at the first level.

3. The combustion process according to claim 2, wherein the first fluid is pure or industrially pure oxygen, having an oxygen concentration of greater than approximately 88% by volume.

4. The combustion process according to claim 3, further comprising controlling and/or regulating the position of a flame created by the separate injection of the first and second fuel.

5. The combustion process according to claim 2, wherein the second fluid is selected from the group consisting of natural gas, butane, propane, liquefied petroleum gas and fuel oil.

6. The combustion process according to claim 5, further comprising controlling and/or regulating the position of a flame created by the separate injection of the first and second fuel.

7. The combustion process according to claim 2, further comprising controlling and/or regulating the position of a flame created by the separate injection of the first and second fuel.

8. The combustion process according to claim 1, wherein the first fluid is pure or industrially pure oxygen, having an oxygen concentration of greater than approximately 88% by volume.

9. The combustion process according to claim 8, wherein the second fluid is selected from the group consisting natural gas, butane, propane, liquefied petroleum gas and fuel oil.

10. The combustion process according to claim 1, wherein the second fluid is selected from the group consisting of natural gas, butane, propane, liquefied petroleum gas and fuel oil.

* * * * *